(12) United States Patent
Deodhar et al.

(10) Patent No.: US 12,044,400 B2
(45) Date of Patent: Jul. 23, 2024

(54) METHOD AND SYSTEM FOR REALTIME MONITORING AND FORECASTING OF FOULING OF AIR PREHEATER EQUIPMENT

(71) Applicant: Tata Consultancy Services Limited, Mumbai (IN)

(72) Inventors: Anirudh Deodhar, Pune (IN); Vishal Jadhav, Pune (IN); Ashit Gupta, Pune (IN); Muralikrishnan Ramanujam, Pune (IN); Venkataramana Runkana, Pune (IN); Mukul Patil, Pune (IN); Charan Theja Dhanda, Bangalore (IN); Dhandapani Subramaniam, Bangalore (IN); Lalith Roshanlal Jain, Bangalore (IN); Joel Thomson Diraviam Andrew, Bangalore (IN); Pankaj Malhotra, Noida (IN); Sai Prasad Parameswran, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 325 days.

(21) Appl. No.: 17/753,779

(22) PCT Filed: Oct. 9, 2020

(86) PCT No.: PCT/IN2020/050868
§ 371 (c)(1),
(2) Date: Mar. 14, 2022

(87) PCT Pub. No.: WO2021/070201
PCT Pub. Date: Apr. 15, 2021

(65) Prior Publication Data
US 2022/0373171 A1 Nov. 24, 2022

(30) Foreign Application Priority Data
Oct. 9, 2019 (IN) .............................. 201921040828

(51) Int. Cl.
*F22B 37/56* (2006.01)
*F28G 15/00* (2006.01)
(Continued)

(52) U.S. Cl.
CPC ............ *F22B 37/56* (2013.01); *F28G 15/003* (2013.01); *G05B 13/048* (2013.01); *G05B 23/0221* (2013.01)

(58) Field of Classification Search
CPC ... F22B 37/56; G05B 13/048; G05B 23/0221; G05B 23/02; G05B 23/021; G05B 23/0243; G05B 23/00; F23G 15/003
See application file for complete search history.

(56) References Cited

U.S. PATENT DOCUMENTS 5,181,482 A * 1/1993 Labbe .................. G05B 13/048
702/182
7,286,960 B2 10/2007 Jammu et al.
(Continued)

FOREIGN PATENT DOCUMENTS

CN 101598688 A 12/2009
CN 203907646 U * 10/2014
(Continued)

OTHER PUBLICATIONS

Yuanhao, Shi et al., "On-line monitoring of ash fouling for air pre-heaters in coal-fired power plant boiler", Energies, Date: 2019, Publisher: MDPI, https://www.mdpi.com/1996-1073/12/5/958/pdf-vor.
(Continued)

*Primary Examiner* — Gregory A Wilson
(74) *Attorney, Agent, or Firm* — FINNEGAN, HENDERSON, FARABOW, GARRETT & DUNNER LLP

(57) ABSTRACT

This disclosure relates generally to a method and system for real time monitoring and forecasting of fouling of an air
(Continued)

preheater (APH) in a thermal power plant. The system is deploying a digital replica or digital twin that works in tandem with the real APH of the thermal power plant. The system receives real-time data from one or more sources and provides real-time soft sensing of intrinsic parameters as well as that of health, fouling related parameters of APH. The system is also configured to diagnose the current class of fouling regime and the reasons behind a specific class of fouling regime of the APH. The system is also configured to be used as advisory system that alerts and recommends corrective actions in terms of either APH parameters or parameters controlled through other equipment such as selective catalytic reduction or boiler or changes in operation or design.

15 Claims, 13 Drawing Sheets

(51) Int. Cl.
*G05B 13/04* (2006.01)
*G05B 23/02* (2006.01)

(56) References Cited

U.S. PATENT DOCUMENTS

| | | | |
|---|---|---|---|
| 11,680,757 B2 * | 6/2023 | Vitse | F28F 27/00 165/288 |
| 2006/0074591 A1 | 4/2006 | Jammu et al. | |

FOREIGN PATENT DOCUMENTS

| | | | | |
|---|---|---|---|---|
| CN | 105069185 A | * | 11/2015 | |
| CN | 105069185 A | | 11/2015 | |
| CN | 108380043 A | * | 8/2018 | B01D 53/8625 |
| CN | 111445072 | | 7/2020 | |
| CN | 115451423 A | * | 12/2022 | |

OTHER PUBLICATIONS

International Search Report and Written Opinion mailed May 24, 2021, in International Application No. PCT/IN2020/050868; 10 pages.

* cited by examiner

Parameters set 3
Stored values of measured/predicted parameters set 0 and parameter set 1 over time period of $t_0$ and $t_c$

Parameters set 5
Stored values of parameter set 2 fouling index predicted over a period time $t_0$ and $t_c$ Diagnostic models

- Class of fouling regime at time $t_c$
- Fouling health score at time $t_c$
- Set of influencing parameters at time $t_c$

Parameters set 3
Stored values of measured/predicted parameters set 0 and parameter set 1 over time period of $t_0$ and $t_c$ Fouling regime class identified at time $t_c$ by diagnostic models

Parameters set 4
Estimated values of parameter set 0 and parameter set 1 between time $t_c$ and $t_{EH}$

METHOD AND SYSTEM FOR REALTIME MONITORING AND FORECASTING OF FOULING OF AIR PREHEATER EQUIPMENT

CROSS-REFERENCE TO RELATED APPLICATIONS AND PRIORITY

This application is a U.S. National Stage Filing under 35 U.S.C. § 371 and claims priority from International Application No. PCT/IN2020/050868, filed on 9 Oct. 2020, which application claims priority under 35 U.S.C. § 119 from Indian Application No. 201921040828, filed on 9 Oct. 2019. The entire contents of the aforementioned applications are incorporated herein by reference.

TECHNICAL FIELD

The disclosure herein generally relates to the field of fouling in air preheaters and, more particularly, to a method and system for real time and online monitoring and forecasting of fouling of air preheaters used in thermal power plants.

BACKGROUND

Air preheater (APH) is an equipment used to recover the excess heat in the exhaust gas from boilers in thermal power plants. The regenerative type of APH typically consists of parallel air and gas flow channels with a regenerative rotating matrix. The heat is first transferred from gas to the rotating matrix and then from the rotating matrix to the air. The matrix is made up of corrugated plates that are designed to enhance the heat transfer characteristics of the APH. Performance of air preheaters and similar equipment in thermal power plants degrade over time both in terms of main operating efficiency as well as from usability perspective.

APH is typically installed on the downstream side of the equipment such as selective catalytic reduction equipment (SCR) that controls the outgoing concentration of nitrogen oxides (NOx). The gas from the boilers typically passes through SCR which uses Ammonia ($NH_3$) to remove NOx from the gas. Some of this $NH_3$ however leaks downstream and reacts with Sulphur Oxides in the flue gas and forms Ammonium bi-sulphate (ABS) predominantly. This bi-sulphate formed cools down and starts condensing in the lower half of the APH. Moreover, bi-sulphate traps the ash particles in the gas and later with more cooling, it solidifies into the pores of APH corrugated plates. This clogging creates resistance to flow and therefore increases the pressure drop. Though initially slow, this build-up of deposits creates enough blocking to put operation of the fans in danger, requiring plant stoppage and water cleaning of the APH. This is referred to as fouling or clogging of the APH. The increased power consumption of fans increases the operating costs and the need to clean the APH incurs tremendous maintenance costs and revenue loss.

Due to difficulty of monitoring the condition of APH fouling in real-time, it is a challenge for an operator to schedule the maintenance of the plant in an optimal way. In order to avoid unplanned maintenance, operator needs to have an online monitoring and forecasting system for APH fouling. Along with that, the operator also needs a system to assist in decision making related to corrective actions to avoid sharp and consistent increase in clogging. Low visibility in the APH operation makes it one of the major reason of unplanned maintenance in a thermal power plant.

Few commercial solutions for above problems comprise of design changes and retrofits, which require stoppage time and are typically very expensive. Plant-level temporary operation modifications prove insufficient to address the APH issues.

SUMMARY

Embodiments of the present disclosure present technological improvements as solutions to one or more of the above-mentioned technical problems recognized by the inventors in conventional systems. For example, in one embodiment, a method for real time monitoring and forecasting of fouling of an air preheater (APH) in a thermal power plant has been provided. The system comprises an input/output interface, one or more hardware processors, and a memory. The input/output interface receives a plurality of data related to the thermal power plant from one or more sources. The memory in communication with the one or more hardware processors, wherein the one or more first hardware processors are configured to execute programmed instructions stored in the one or more first memories, to: preprocess the received plurality of data; monitor the air preheater using a plurality of monitoring models, the plurality of monitoring models is configured to soft-sense a set of fouling parameters, wherein the set of fouling parameters comprises: a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH; diagnose using a diagnostic model, a current fouling regime in the APH using the preprocessed plurality of data and the soft sensed fouling parameters, wherein the diagnosis provides: classification of current fouling regime of APH, and one or more influencing parameters of current fouling regime; forecast using a forecasting model, the fouling condition for a forecast horizon, wherein the forecast is obtained through: estimating one or more influencing parameters for an estimation horizon using the received plurality of data, forecasting the fouling index for each of the one or more layers of APH for the selected forecast horizon using the estimated one or more influencing parameters and the classified fouling regime, and forecasting the fouling conditions comprising of pressure drop for the selected forecast horizon using the estimated one or more influencing parameters and the forecasted fouling index for each layer; estimate a minimum time to outage of the APH based on the forecasted fouling conditions and the identified fouling regime; provide an alert to a user if the estimated minimum time to plant outage is less than a predefined threshold; and recommend a plurality of corrective actions to minimize the losses and avoid plant outage based on forecasted fouling conditions and identified fouling regime.

In another aspect, a method for real time monitoring and forecasting of fouling of an air preheater (APH) in a thermal power plant is provided. Initially, a plurality of data related to the thermal power plant is received from one or more sources. The received plurality of data is then preprocessed. Further, the air preheater is monitored using a plurality of monitoring models, the plurality of monitoring models is configured to soft-sense a set of fouling parameters, wherein the set of fouling parameters comprises: a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH. In the next step, a current fouling regime in the APH is diagnosed using the preprocessed plurality of data and the soft sensed fouling parameters, wherein the diagnosis provides: classification of current fouling regime of APH, and one or more influencing parameters of current fouling regime. Further, the fouling condition is forecasted for a forecast horizon, wherein the forecast is obtained through: estimating one or more influencing parameters for an estimation horizon using the plurality of data, forecasting the fouling index for each of the one or more layers of APH for the selected forecast horizon using the estimated one or more influencing parameters and the classified fouling regime, and forecasting the fouling conditions comprising of pressure drop for the selected forecast horizon using the estimated one or more influencing parameters and the forecasted fouling index for each layer. Further, a minimum time to outage of the APH is estimated based on the forecasted fouling conditions and the classified fouling regime. In the next step, providing, via the one or more hardware processors, an alert to a user if the estimated minimum time to plant outage is less than a predefined threshold. And finally, a plurality of corrective actions are recommended to minimize the losses and avoid plant outage based on forecasted fouling conditions and identified fouling regime.

In yet another aspect, one or more non-transitory machine readable information storage mediums comprising one or more instructions which when executed by one or more hardware processors cause real time monitoring and forecasting of fouling of an air preheater (APH) in a thermal power plant. Initially, a plurality of data related to the thermal power plant is received from one or more sources. The received plurality of data is then preprocessed. Further, the air preheater is monitored using a plurality of monitoring models, the plurality of monitoring models is configured to soft-sense a set of fouling parameters, wherein the set of fouling parameters comprises: a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH. In the next step, a current fouling regime in the APH is diagnosed using the preprocessed plurality of data and the soft sensed fouling parameters, wherein the diagnosis provides: classification of current fouling regime of APH, and one or more influencing parameters of current fouling regime. Further, the fouling condition is forecasted for a forecast horizon, wherein the forecast is obtained through: estimating one or more influencing parameters for an estimation horizon using the plurality of data, forecasting the fouling index for each of the one or more layers of APH for the selected forecast horizon using the estimated one or more influencing parameters and the classified fouling regime, and forecasting the fouling conditions comprising of pressure drop for the selected forecast horizon using the estimated one or more influencing parameters and the forecasted fouling index for each layer. Further, a minimum time to outage of the APH is estimated based on the forecasted fouling conditions and the classified fouling regime. In the next step, providing, via the one or more hardware processors, an alert to a user if the estimated minimum time to outage is less than a predefined threshold. And finally, a plurality of corrective actions are recommended to minimize the losses and avoid plant outages based on forecasted fouling conditions and identified fouling regime.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
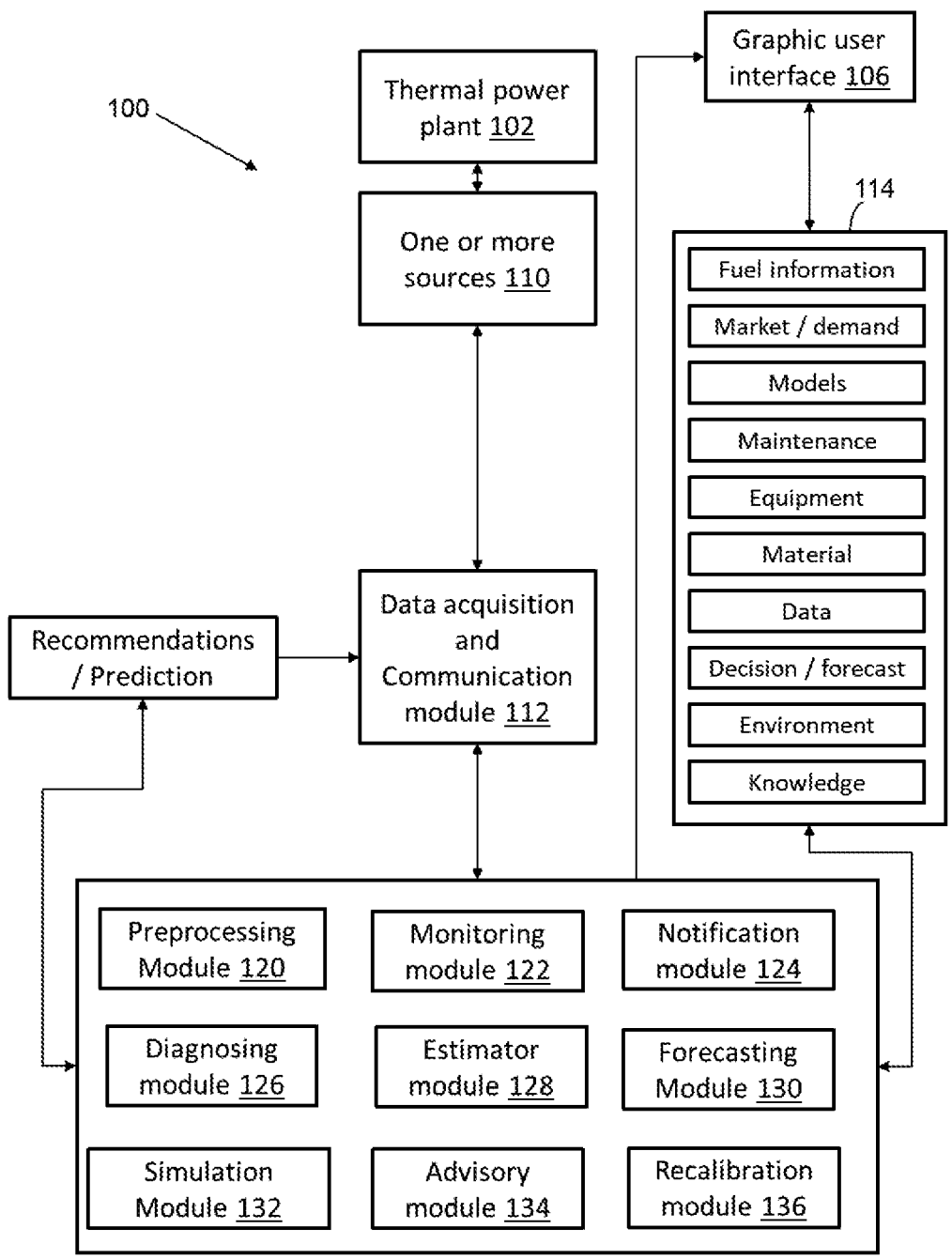
FIG. 1 illustrates a block diagram of a system for real time monitoring and forecasting of fouling of an air preheater (APH) in a thermal power plant according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

There are few model-based monitoring systems for the APH described in prior art. Few describe a purely data-driven method for health monitoring and prognosis. Some provide system for monitoring and fouling of APH in coal fired power plants based on an anomaly detection and diagnosis. Few publications have reported use of heat balance for online monitoring APH air leakage and fouling. In addition, there have been few studies on detailed modeling of location of APH fouling and quantifying influence of key parameters on fouling as well.

Most prior arts address the problem of only ash deposition in APH. Real-time monitoring of ash entrapment with solidifying ammonium bisulphate is not addressed satisfactorily. In addition, real-time monitoring and forecasting of chemical deposition levels and location is not covered. There are no comprehensive systems available for future forecast of APH fouling condition in terms of ammonium bi-sulphate and ash deposition, considering the impact of coal used and process conditions expected. Moreover, most online monitoring systems do not consider comprehensive view of boiler, pulverizer, SCR and APH together from the APH fouling perspective. Due to limited measurements done inside the APH, it is difficult to predict the internal conditions, especially with data—driven or empirical predictive models alone.

Referring now to the drawings, and more particularly to FIG. 1 through FIG. 12B, where similar reference characters denote corresponding features consistently throughout the figures, there are shown preferred embodiments and these embodiments are described in the context of the following exemplary system and/or method.

According to an embodiment of the disclosure, a system 100 for real-time monitoring and forecasting of fouling of air preheaters (APH) in a thermal power plant 102 is shown in the schematic diagram of FIG. 1. The system 100 is deploying a digital replica or digital twin that works in tandem with the real APH of the thermal power plant 102. The system 100 receives real-time data from one or more sources and provides real-time soft sensing of intrinsic parameters as well as that of health, fouling related parameters of APH. The intrinsic parameters comprise of temperature, chemical deposition level and location, layer wise fouling index and pressure differential. The system 100 is also configured to diagnose the current class of fouling regime and the reasons behind a specific class of fouling regime of the APH. The system 100 is also configured to be used as advisory system that alerts and recommends corrective actions in terms of either APH parameters such as soot-blower or parameters controlled through other equipment such as selective catalytic reduction (SCR) or boiler or changes in operation or design.

Figure 2:
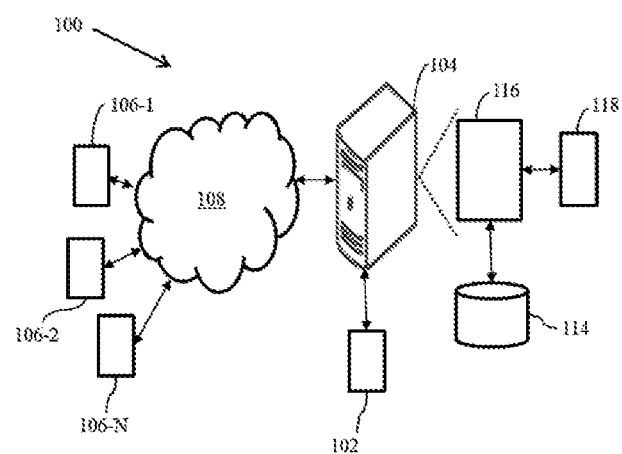
FIG. 2 is a network diagram of the system for real time monitoring and forecasting of fouling of an air preheater (APH) in a thermal power plant according to some embodiments of the present disclosure.

According to an embodiment of the disclosure, a network diagram (architectural view) for real-time monitoring and forecasting of fouling of air preheaters (APH) in the thermal power plant 102 is shown in FIG. 2. It may be understood that the system 100 may comprises one or more computing devices 104, such as a laptop computer, a desktop computer, a notebook, a workstation, a cloud-based computing environment and the like. It will be understood that the system 100 may be accessed through one or more input/output interfaces or graphic user interfaces 106-1, 106-2 . . . 106-N, collectively referred to as I/O interface 106. Examples of the I/O interface 106 may include, but are not limited to, a user interface, a portable computer, a personal digital assistant, a handheld device, a smartphone, a tablet computer, a workstation and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The system 100 is connected to one or more sources 110 such as plant DCS or other similar systems as shown in FIG. 1. The one or more sources 110 may include the thermal power plant's data recording, retrieval and control systems. For example, the plant distributed control system (DCS), Laboratory information management system (LIMS), historian and other systems are connected to the system 100 through a two-way communication channel via a data acquisition and communication module 112. The system 100 receives a real-time data from the thermal power plant 102, which is stored in a data repository 114. The system 100 provides real-time monitoring, forecast and recommendations, which is communicated back to a control system of the thermal power plant 102 and the operator through a graphic user interface 110. There is also a way of entering manual data or information through the system 100.

According to an embodiment of the disclosure, a block diagram of the system 100 for real-time monitoring and forecasting of fouling of air preheaters (APH) in the thermal power plant 102 is shown in FIG. 1. The system 100 comprises the graphic user interface 106, one or more sources 110, one or more hardware processors 116 and a memory 118 in communication with the one or more hardware processors 116. The one or more hardware processors 116 are configured to fetch a set of instructions from the memory 118. The memory 118 further comprising a plurality of modules for performing various functions. The plurality of modules comprising a preprocessing module 120, a monitoring module 122, a notification module 124, a diagnosing module 126, an estimator module 128, a forecasting module 130, a simulation module 132, an advisory module 134 and a recalibration module 136.

According to an embodiment of the disclosure, the system 100 comprises the data repository 114 or a database 114. The system 100 is characterized with the database 114 that stores different kinds of information such as static information and dynamic information. Static information comprises plant design information, maintenance information, fuel information, equipment information and so on. The dynamic information comprises processed/raw plant data, predictive models and their versions, predicted and forecasted data, identified optimum recommendations, for instance. The system 100 receives data from the thermal power plant 102 or an operator/a user in real-time and responds back near real-time/real-time in terms of actionable control decisions or insightful forecasts and diagnostics for the thermal power plant 102.

According to an embodiment of the disclosure, the graphic user interface (GUI) 106 is the user interface 106 of the system 100 which is used by a user or an operator of the system 100. The GUI 106 works as interactive mode to exchange information between the system 100, the data repository 114 and the user. The GUI 106 is also configured to display the outcomes from digital replica along with the real thermal power plant operation in real time. The user interacts with the system 100 via the GUI 106. The GUI 106 is accessible to the user via smartphones, laptop or desktop configuration thus giving the user the freedom to interact with the system 100 from anywhere anytime. The graphic user interface 106 may include a variety of software and hardware interfaces, for example, interfaces for peripheral device(s), such as a keyboard, a mouse, an external memory, a camera device, and a printer. The interfaces 106 can facilitate multiple communications within a wide variety of networks and protocol types, including wired networks, for example, local area network (LAN), cable, etc., and wireless networks, such as Wireless LAN (WLAN), cellular, or satellite. It should be appreciated that the GUI 106 can also be available at a remote location such as on a cloud or a remote monitoring center.

According to an embodiment of the disclosure, the memory 118 comprises the preprocessing module 120. The preprocessing module 120 is configured to preprocess the received plurality of data is preprocessed. The preprocessing may comprise of checking erroneous data in the plurality of data,
removing outliers in the plurality of data,
imputing new values in place of missing values,
merging and synchronizing plant data from multiple sources,
synchronizing the plurality of real-time data with the past data,
transforming the plurality of data into different shape, size and frequency based on the APH design specifications, required forecasting objectives and the available plant data.

According to an embodiment of the disclosure, the memory 118 comprises the monitoring module 122. The monitoring module 122 is configured to monitor the air preheater using a plurality of monitoring models, the plurality of monitoring models is configured to soft-sense a set of fouling parameters, wherein the set of fouling parameters comprises: a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH. The plurality of monitoring models such as thermal monitoring model and fouling monitoring model are pre-built based either on physics-based simulation, data driven techniques, knowledge based models or combination thereof. These predictions are based on the past data stored in the database 114 as well as the real-time processed data received by the system 100. The predictions may also make use of few tuning parameters stored in the database 114, which are learnt based on historical data or expert knowledge.

The soft sensors are used to obtain the real-time estimation of the plurality of parameters that are often not measurable or not measured. For example, the monitoring module 122 receives the pre-processed plurality of data in real time and estimates air/gas temperature profile or metal temperature profile within the APH. Typically, the APH rotary element is made up of two or three layers. The rotating element further causes invisibility of the process happening inside the equipment. Operator is uncertain about the formation and deposition of ABS in the equipment. Thus, a monitoring model is used to soft-sense the location and quantity of chemical deposition (i.e. ABS and ash deposition) in each layer. The deposition in the bottom layer is usually removable through soot-blowing. However, the deposition in the intermediate layer often critically endangers the equipment. Thus, the monitoring module 122 provides a one-glance overview of the current fouling level of APH by predicting fouling index in real time. It allows the operator to have a better view of the status quo by estimating the fouling intensity in each layer and then predicting the remaining useful life for each layer.

Figure 3:
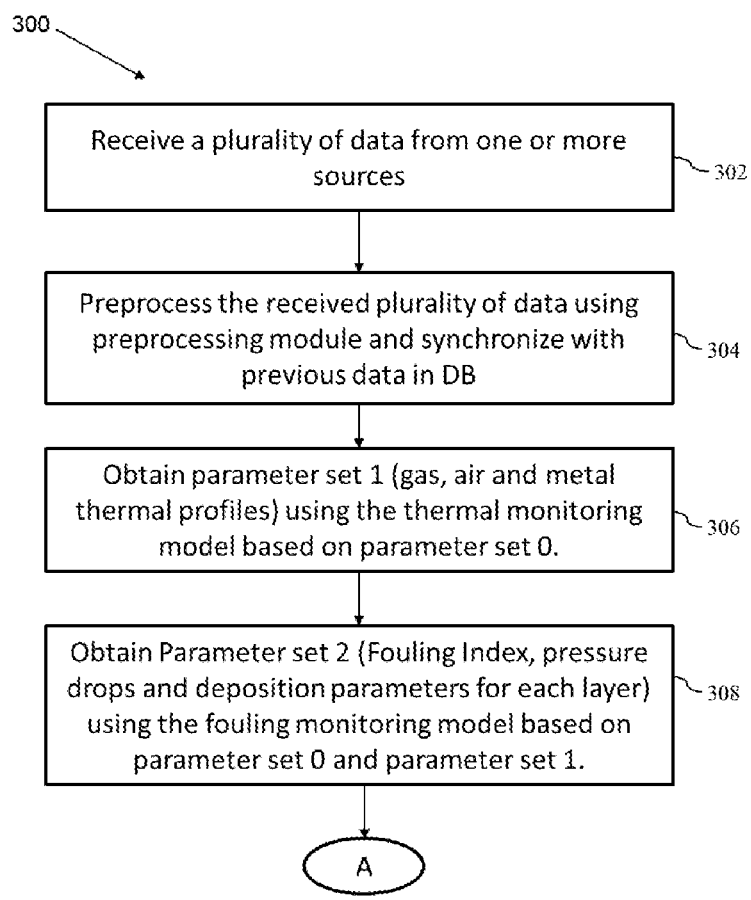
FIG. 3 is flowchart showing the real-time monitoring of the APH in the thermal power plant in accordance with some embodiments of the present disclosure.

A method of real-time monitoring of the APH in thermal power plant is shown in the flowchart 300 of FIG. 3. The method is instantiated at regular intervals or as desired by the plant operator/user. At step 302, the plurality of data is received from one or more sources. This data may comprise of real-time operation data from a plurality of sensors for the APH and upstream and downstream equipment,
ambient conditions data from internal or external sources,
fuel and materials property, usage and inventory data,
design specifications data for the APH and the thermal power plant,
maintenance history and scheduling data.

At step 304, the received plurality of data is preprocessed using one or more of methodology mentioned above. At step 306, a real time thermal monitoring model is used to predict gas, air temperature profile and metal temperature profile inside the APH. And finally at step 308, a real time fouling monitoring model is used to predict the fouling index for each layer, quantity and location of chemical deposition in each layer and the pressure drop across each layer of APH. The output of the monitoring is provided as input to the flowchart 600 of FIG. 6.

Figure 4:
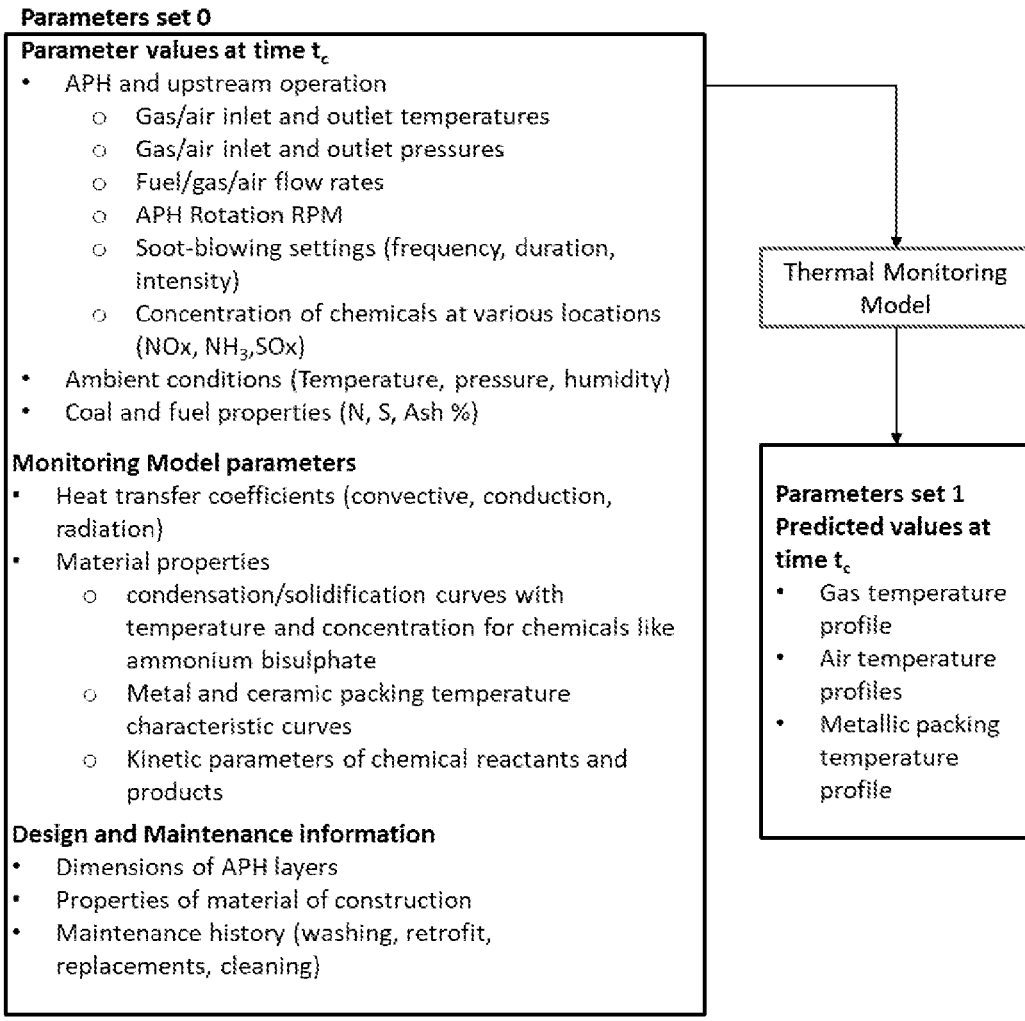
FIG. 4 shows a schematic representation of a thermal monitoring model with input and output parameters in accordance with some embodiments of the present disclosure.

FIG. 4, shows a schematic representation of the thermal monitoring model. The thermal monitoring model is a combination of data driven, physics based, knowledge based or a combination of mentioned. As an example, a one-dimensional physics-based model can be used to predict gas, air and metal axial temperature profiles using input data described as parameter set-0. The parameter set-0 may comprise of operating conditions within and outside APH, ambient conditions, fuel properties, chemical composition of gases, design and maintenance information of APH. In addition, it may also consist of some tuning parameters for the physics-based model such as heat transfer coefficients, specific heat and characteristic temperature curves available. These tuning parameters can be tuned by solving a set of algebraic and ordinary/partial differential equations in the model and minimizing the prediction error against measured sensor values. The output of thermal monitoring model is described as parameter set-1, which comprises of air, gas and metal temperature profiles inside the APH. Examples of parameter set -0 and parameter set -1 are shown in FIG. 4.

Figure 5:
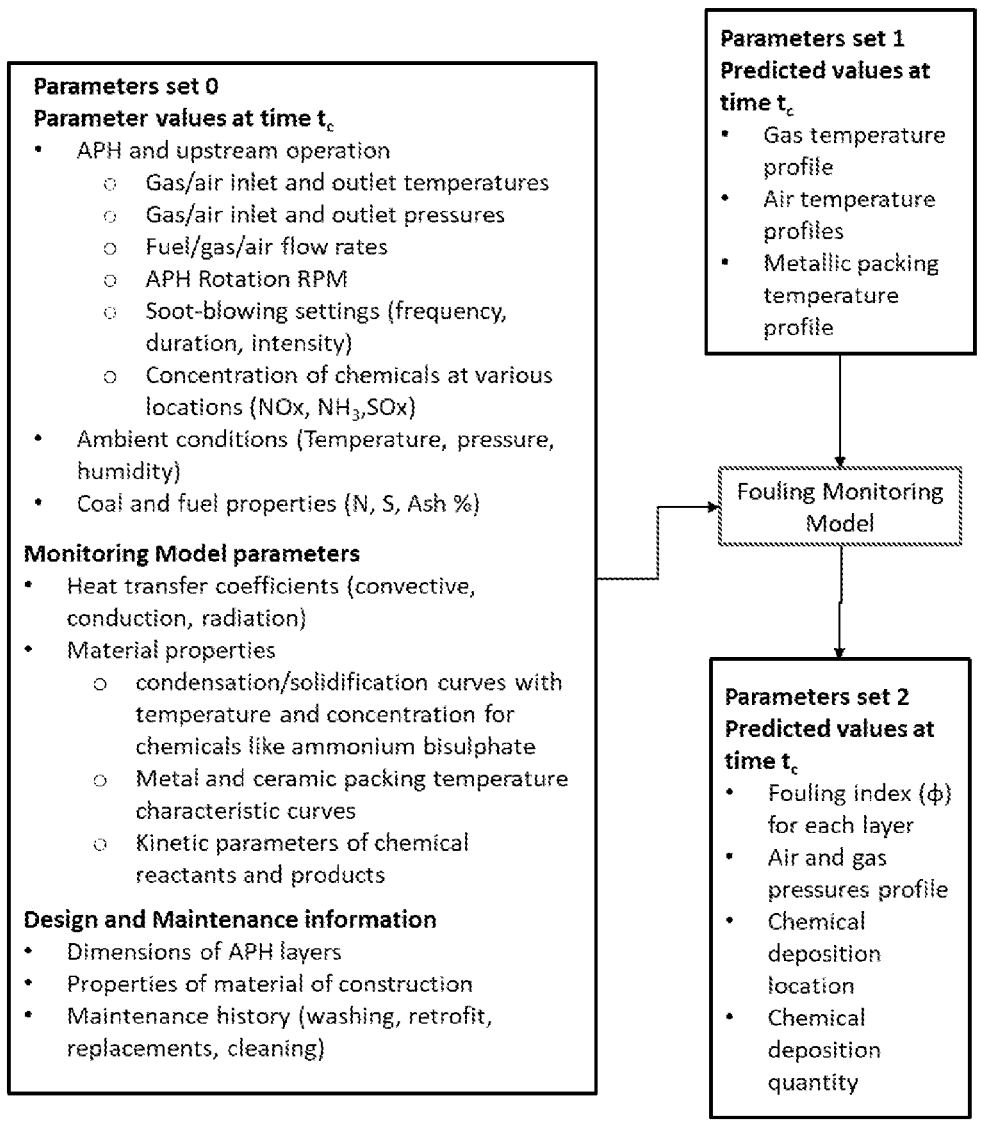
FIG. 5 shows a schematic representation of a fouling index monitoring model with input and output parameters in accordance with some embodiments of the present disclosure.

FIG. 5 shows a schematic representation of the fouling monitoring model working in real time to predict the chemical deposition quantity and location in every layer of APH. It also predicts the fouling index and pressure profile at each layer inside the APH. The fouling monitoring model could be a combination of data driven, physics based, knowledge based or a combination of mentioned. The fouling monitoring model has the provision to use output of thermal monitoring model (parameter set-1) and parameter set-0 as an input to predict parameter set-2.

As an example, the fouling monitoring model comprises of a physics-based model that solves a set of algebraic, differential equations with pressure, chemical concentrations and fouling index (q) as parameters. First the fouling monitoring model uses physics-based equations and a set of domain-knowledge based rules to predict the formation of chemical deposits such as ammonium bisulphate and its location of deposition within the APH. For example, the temperature profile predicted by the thermal monitoring model is used to predict how much chemical formation and deposition will occur within the APH by using the knowledge of condensation and solidification temperature curves for Ammonium bisulphate. These characteristic curves describe the variation of condensation and solidification temperatures for ammonium bisulphate as a function of temperature, pressure and concentrations of species and could be obtained from publicly available handbooks.

Chemical formation, deposition and location is a function of (internal gas, air and metal temperature profiles, gas/air flow rate, concentration of species condensation and solidification curves for ammonium bisulphate, APH design configuration, chemical kinetic parameters, time of operation)

This step predicts in real-time how much new formation of ammonium bisulphate has occurred and where is it likely to deposit within APH (layer 1, layer 2 or layer 3). Rules connecting the fouling index of 3 or more layers are automatically formed based on this estimation.

The fouling index (q) for each layer is then represented as void fraction in the physics-based equations solving for pressure. Then the fouling index for each layer is predicted using the pressure profile estimation part of the fouling monitoring model. The fouling index estimation is formulated as an internal optimization problem that minimizes the error between predicted pressure and the measured pressure at the outlet of APH with an addition constraint of the rules formulated by the chemical deposition estimation above. An example set of constraint rules could be—

$\varphi1 > \varphi2 > \varphi3$ indicating that deposition is most likely in the coldest layer (bottom most)

rate of change of $\alpha1$ $(d\varphi1/dt)$~steady, as function of time of operation and ash deposition, (indicating that the top layer does not see significant deposition of chemicals such as ammonium bisulphate, because of higher gas temperatures)

if (temperature of gas in layer 2 and 3>solidification/ condensation temperature of ammonium bisulphate):

rate of change of $\varphi2$ and $\varphi3$~steady, as function of time of operation and ash deposition if (temperature of gas in layer 2 and 3<solidification/ condensation temperature of ammonium bisulphate):

rate of change of $\varphi2$ and $\varphi3$~dynamic, as function of time of operation, ash deposition and gas temperatures Solving the mentioned optimization problem with constraints like these, yields real-time soft sensed values of chemical deposition, location of deposition, fouling index of each layer and the pressure profile within APH. These results could also be obtained via a more rigorous computational fluid dynamics model that can be tuned with respect to the real-time sensor data from the plant. The results of the above-mentioned models are stored in the database 114 and are shown to the operator on GUI via the notification module 124.

According to an embodiment of the disclosure, the memory 118 comprises the diagnosing module 126. The diagnosing module 126 is using a diagnostic model and configured to diagnose a current fouling regime in the APH using the preprocessed plurality of data and the soft sensed fouling parameters, wherein the diagnosis provides: classification of current fouling regime of APH, health score of APH and one or more influencing parameters of current fouling regime.

Figure 6:
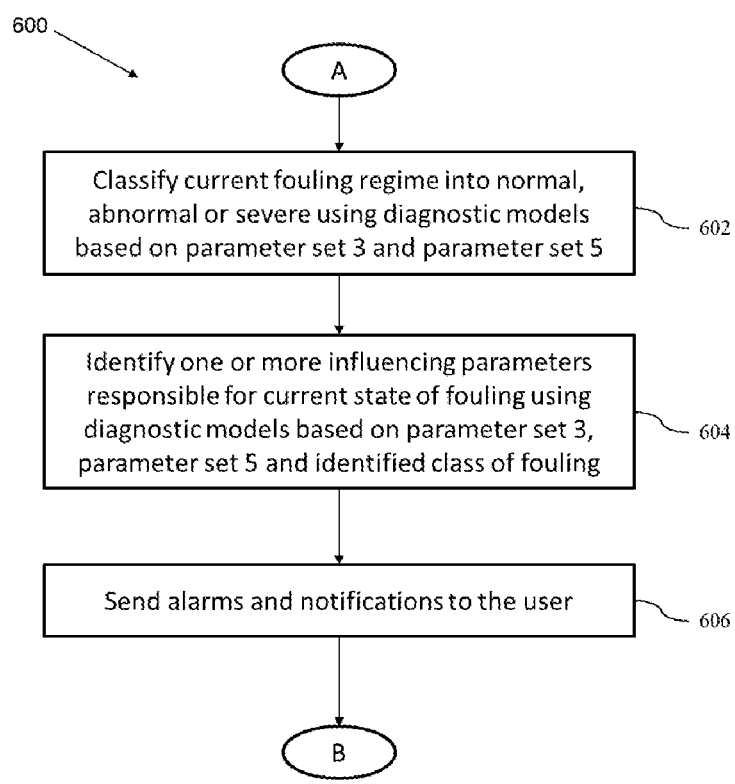
FIG. 6 is flowchart showing the operation of the diagnosing module of FIG. 1 in accordance with some embodiments of the present disclosure.
Figure 7:
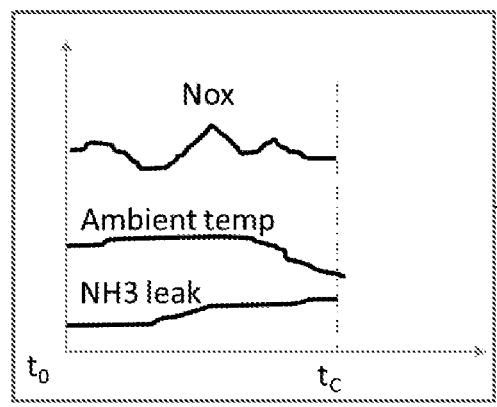
FIG. 7 shows a schematic representation of a diagnostic model with input and output parameters in accordance with some embodiments of the present disclosure.
Figure 7:
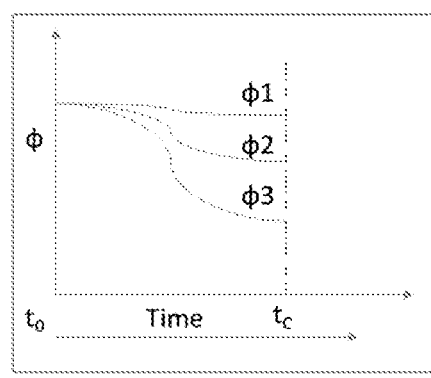

The operation of diagnosing module 126 is shown in the flowchart of FIG. 6. The diagnosing module 126 comprises of diagnostic models that are a combination of physics based, data driven or knowledge-based models. Initially at step 602, the diagnostic models make use of parameters indicated as parameter set-3 and parameter set-5 and provide real-time identification of the current class of fouling regime, as shown in FIG. 7. Parameters set-3 and parameter set -5 are past recorded values of parameter set-0, 1 and 2 over a period of $t_0$ and $t_C$. The fouling regimes could be classified as one of normal fouling, abnormal fouling or severe fouling. Alternatively, the fouling regimes could also be classified based on a health score calculated by the diagnostic model. The normal regime indicates lower rates of fouling increase for that particular plant, abnormal fouling suggests continuous monitoring as the fouling rates are climbing and the severe fouling regime indicates urgent action. The definitions of these classes are predefined for a specific plant based on the APH design configurations and typical length of APH life cycles (period between two shutdowns and water washings of APH).

The diagnostic model as an example, may comprise of a deep learning based anomaly detection model that continuously monitors the set of sensors and set of soft sensed parameters (from the monitoring module) over a period of fixed windows of time and then determine the classification of current fouling regime. These models are pre-trained based on plurality of past data (indicated by time window $t_0$ to $t_C$) from the plant and stored in the database 114, where $t_C$ is current time and $t_0$—starting timing of window of interest. The time window to to $t_C$ could be selected during training of the model and varies from plant to plant, depending upon the length of APH fouling lifecycles and plant specific requirements.

Further at step 604, once the class of current fouling regime is identified, the diagnostic models also identify the topmost influencing parameters responsible for the current fouling regime condition. For example, when the fouling regime turns severe from abnormal over a period of time, the diagnostic models may identify the parameters such as change in ambient conditions, reduced soot-blowing or increased ammonia leak from SCR as possible causes. The pre-trained diagnostic models may use domain-based rules (such as failure root cause analysis), physics based soft sensors from monitoring module and data driven inferences to identify the influential parameters. Alternatively, the influential parameters could also be identified based on the individual parameter anomaly score calculated by the diagnostic model. And finally, at step 606, the operator is alerted based on the identified class of fouling regime and the respective influential parameters.

Figure 8:
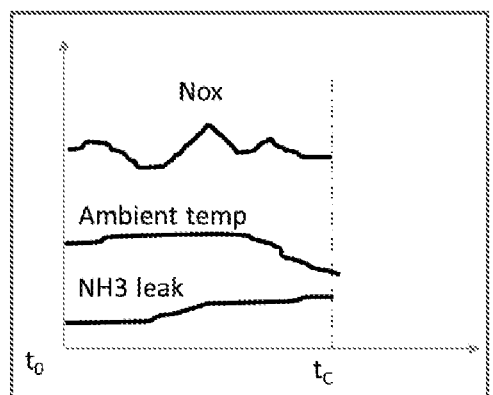
FIG. 8 shows a schematic representation of an estimator model with input and output parameters in accordance with some embodiments of the present disclosure.
Figure 8:
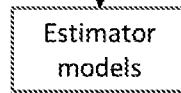
Figure 8:
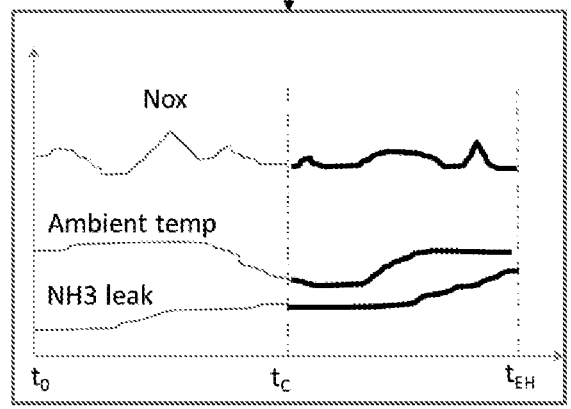

According to an embodiment of the disclosure, the memory 118 comprises the estimator module 128. The estimator module 128 is configured to estimate a set of parameters using an estimator model and the preprocessed plurality of data. The estimator module may comprise of estimator models for parameters such as ambient conditions, NOx concentration, $NH_3$ leak, mass flow rate of air/gas, SOx concentration, ash concentration, gas/air temperatures at the ends etc. as well as soft sensed variables from monitoring module such as axial temperature profile and deposition levels in each layer. The estimator models are designed to estimate the future values of the key parameters as a function of past and current data. The estimator module 128 may also comprise of predictive models from the digital systems for other downstream and upstream equipment. For example, the estimator module 128 may interface with digital replica for Selective Catalytic Reduction (SCR) equipment to predict $NH_3$ leak in real-time The estimator models may comprise of a combination of first principles-based, data driven and knowledge-based models. A schematic representation of the estimator model is shown in FIG. 8, a univariate time series model can be used to estimate trends of ambient temperature using the past years weather data or weather report of current year or a combination of both. The estimator model for Ammonia leak can be a multivariate time series model built based on SCR degradation, coal ultimate analysis, boiler settings, NOx output set point etc. This multivariate time series model receives the past data and external inputs to estimate the trend of $NH_3$ leak in future. As shown in FIG. 8, the pre-trained estimator models have a preselected estimator horizon indicated by time period $t_C$ to $t_{EH}$, where $t_{EH}$ indicates the end time of estimation horizon from current time $t_C$. The estimator models utilizes past data (parameters set-0 and 1) over a period of $t_0$ to $t_C$, indicated by parameters set-3 and predict trends of the same parameters over a period $t_C$ to $t_{EH}$ indicated by parameter set-4. The estimator module also accommodates user inputs for certain parameters that are decided by the plant operation strategy. For example, the future trend of coal types of uses, soot-blowing patterns could be entered by the user if required.

The objective of the estimator module 128 is to enhance the forecasting capability of the forecasting module 130 so that operator can take informed decisions based on a long-term view of the fouling progression. Estimator models enable longer and more accurate forecast of the fouling conditions in the next step.

According to an embodiment of the disclosure, memory 114 further comprises the forecasting module 130 and the notification module 124. The forecasting module 130 is configured to provide a forecast of plurality of APH fouling and APH health indicators using a prebuilt forecasting model. Pre-built forecasting models may comprise of combination of physics-based models, data-driven models or knowledge-based models. The forecasting models may comprise of fouling forecast models and the pressure drop forecast models. They forecast the fouling conditions of APH several months/days in advance, indicated by forecasting horizon, time period between $t_C$ and $t_{FH}$. The forecast horizon depends upon the data available and the requirement and can be automatically selected or chosen by user. The fouling conditions forecasted include fouling index at each layer and the pressure drop across APH. The forecast can be updated after a specific period or can also be obtained on demand.

Inputs required for forecasting model may comprise of real-time and past processed data stored in the database and estimated outputs from the estimator module. For example, a forecast of differential pressure across the APH representing fouling levels, may be obtained based on past processed data, estimated trends in key variables such as NOx concentration, $NH_3$ leak, ambient temperature as well as estimated trends in soft sensed variables like gas/air temperature profile and forecasted trends in fouling indicators like fouling index. Additional tuning parameters like forecast intervals; may also be required for the forecasting models, which in turn could be extracted from previous data or from the expert knowledge. Another set of parameters that could be used comprises of plant specific information such as design and maintenance information. The results of the above-mentioned models are stored in the database and are shown to the operator on GUI via the notification module 124.

Figure 9:
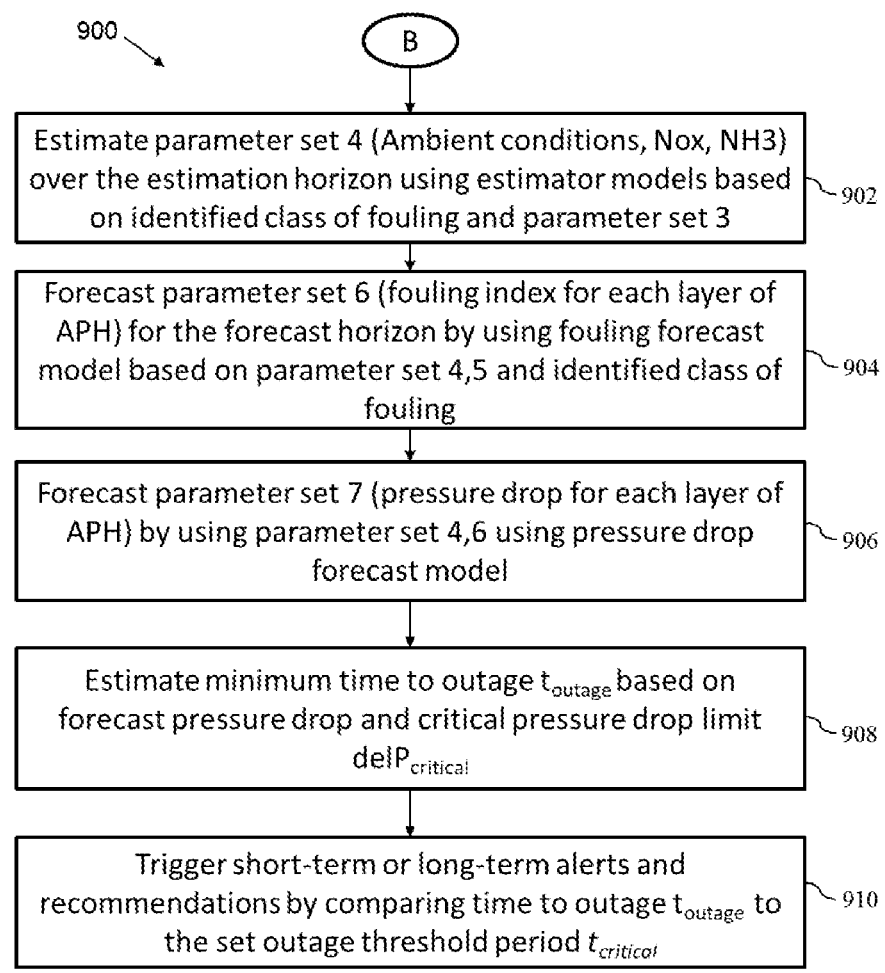
FIG. 9 is flowchart showing the operation of the forecasting module of FIG. 1 in accordance with some embodiments of the present disclosure.

A method of real time forecasting of fouling levels of the APH in the thermal power plant is shown in flowchart 900 of FIG. 9. At step 902, the estimator model is used to estimate trends in key variables like $NH_3$ leak, NOx concentration, ambient temperature as well as estimate trends in soft sensed variables like gas/air temperature profile till forecast horizon.

Figure 10:
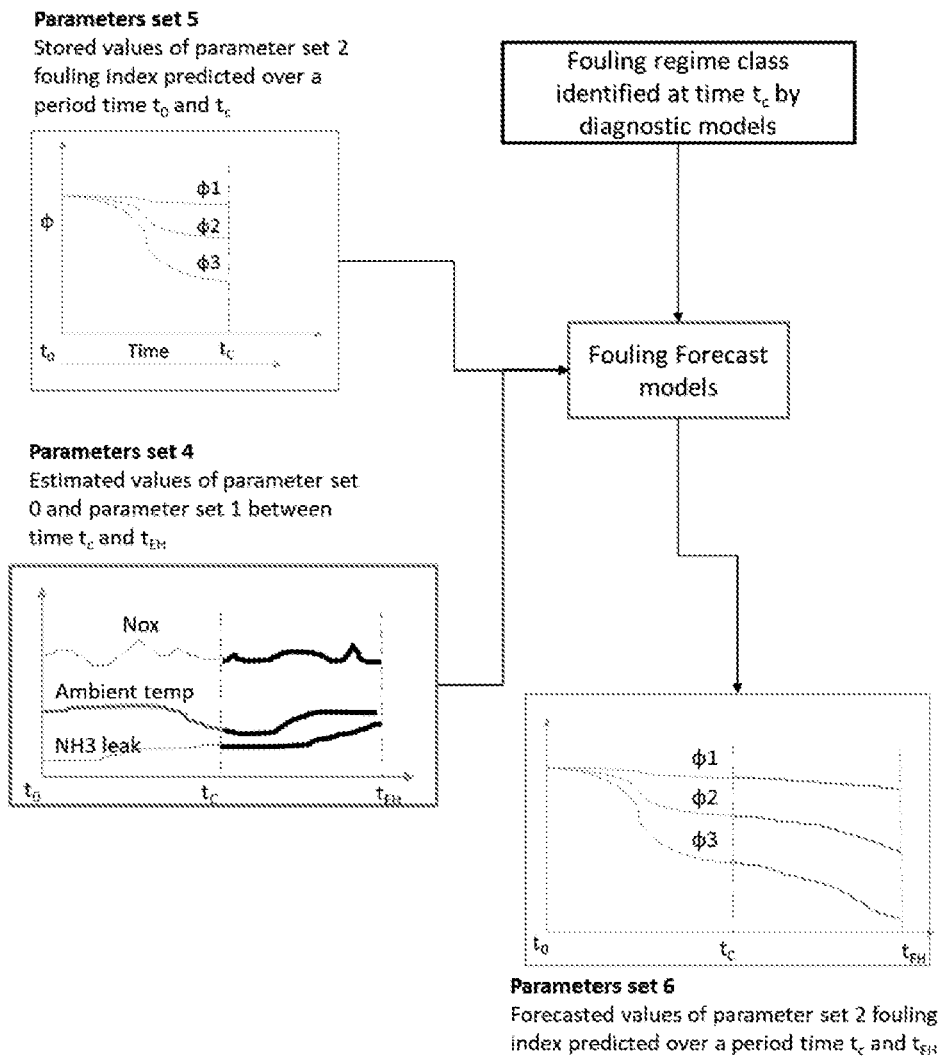
FIG. 10 shows a schematic representation of a fouling forecast model with input and output parameters in accordance with some embodiments of the present disclosure.

At step 904, parameter set-6 is forecasted over a forecast horizon indicated by time period between $t_C$ and $t_{FH}$. It uses parameters set-4 and parameter set-5 as input into the fouling forecast model. The parameters set-6 is composed of fouling index values forecasted for each layer of the APH over the forecast horizon. Parameter set-4 and parameters set-5 are shown in FIG. 10. As an example, the fouling forecast model comprises of a deep learning based data driven model that predicts the future trends in fouling index of each layer of APH as a function of past trends of soft sensed and sensor parameters obtained from previous monitoring and diagnostic models. The forecast of future fouling levels provides extra information about the possible degradation and deposition in each layer of APH.

Figure 11:
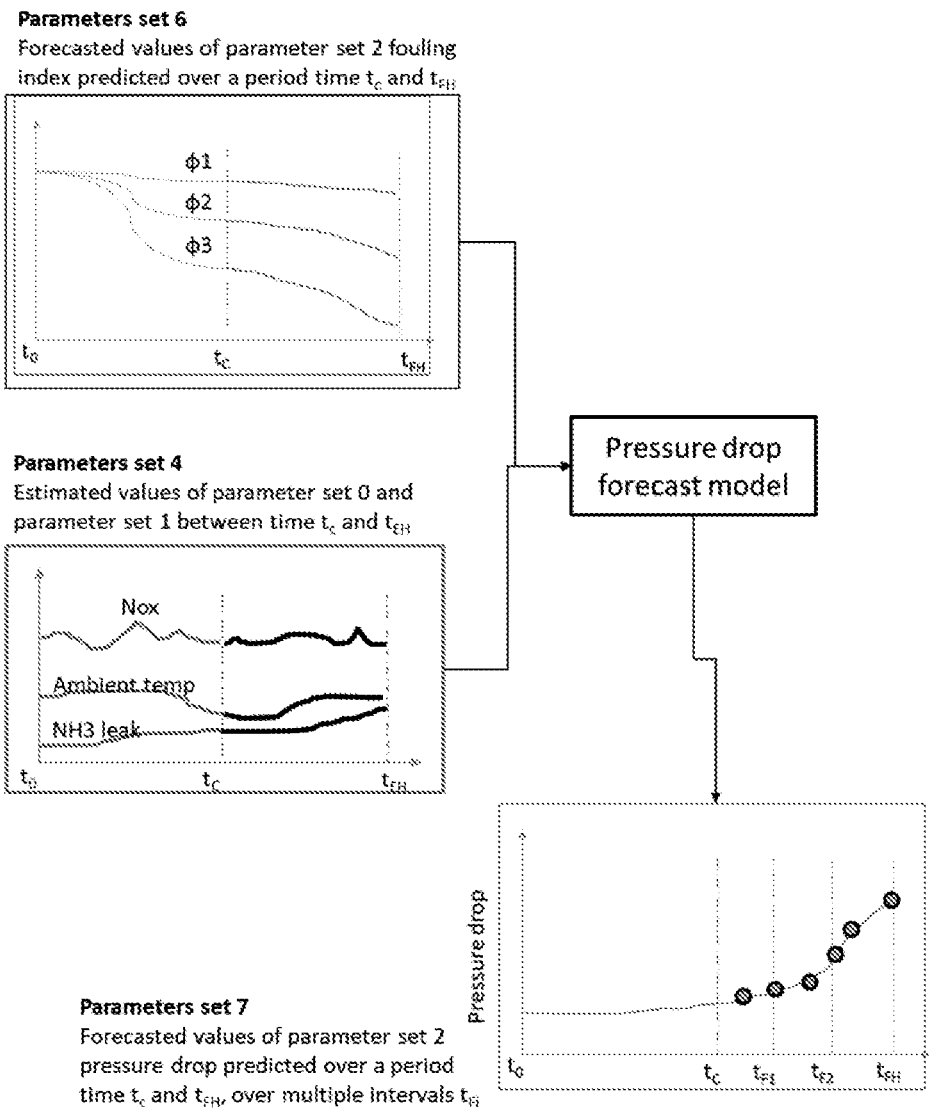
FIG. 11 shows a schematic representation of a pressure drop forecast model with input and output parameters in accordance with some embodiments of the present disclosure.

At step 906, a pressure drop forecast model is used to forecast the pressure drop profile across the APH over a period of forecast horizon $t_{FH}$ (indicated by parameter set-7), using parameter set-5 and parameters set-6. FIG. 11 indicates few examples of inputs and outputs of the pressure drop forecast model. As an example, the pressure drop forecast model comprises of physics-based model that solves a set of differential and algebraic equations, used at regular intervals repeatedly over the period of forecast horizon $t_{FH}$. The intervals, a first time interval ($t_{F1}$), a second time interval ($t_{F2}$) and so on shown in FIG. 11, could be preselected or can be chosen by the user as per the need. The pressure drop forecast model is used at each of these time intervals $t_{F1}$, $t_{F2}$ and so on to identify the trend in pressure drop across APH. Every time the pressure drop forecast model is triggered at a particular time interval, the set of input parameters from parameters set-4 and parameters set-6 are automatically obtained from the database. The values of parameters set-0, 1, 2, 3, 4, 5, 6 and 7 are continuously updated in the database.

At step 908, a minimum time to outage ($t_{outage}$) is estimated by calculating the time period left for the forecasted pressure drop to cross a critical pressure drop limit ($delP_{critical}$). At step 910, if $t_{outage}$ is found to be less than the outage threshold period ($t_{critical}$), the short-term alert is triggered. If $t_{outage}$ is found to be more than the outage threshold period $t_{critical}$, the long-term alert is triggered. Short-term alert indicates less time left for possible water cleaning and need of urgent action to avoid forced outage. A long-term alert indicates relative safety from immediate forced outage, but a possible forced outage in near future if same trend continues. The pressure drop limit delP$_{critical}$ and the outage threshold period $t_{critical}$ are chosen based on the specific fouling life cycles of APH for that particular plant as well as the need of the operator/manager. The limits can be set automatically based on historical data or can be modified by the user.

The notification module 124 is configured to provide an alert to the user if the predicted forecast of the plurality of parameters is moving out of a predefined threshold. The notification module 124 also provides the operator with two types of alerts—short-term and long term. The short-term alert needs immediate attention because it means that the fouling may reach threshold levels within near future, disrupting the performance and potentially resulting in loss of revenue. The long-term alerts may provide the user a larger window of time such as 3-6 months in order to take a corrective action.

According to an embodiment of the disclosure, the system 100 may also comprise the advisory module 134. The advisory module 134 is configured to provide a set of operation set points and recommendations to the operator for improving the fouling and heat transfer performance of the APH.

At step 910, a short-term or a long-term advisory is triggered based on the previous step alert that provides the user with a set of operating and maintenance instructions to avoid losses due to APH fouling. The recommendations can be displayed along with the alerts on the interactive user interface. Alternatively, the recommendations suggested by advisory module may be directly implemented in the plant with or without a user approval.

A short-term recommendation is aimed at avoiding imminent forced outage of the plant by modifying the operating conditions or the maintenance schedule. As an example, if the pressure drop forecast from forecasting module suggests pressure drop exceeding 1.5 MPa (delP$_{critical}$) within next 90 days ($t_{critical}$), the advisory module may suggest a set of operating recommendations based on domain based and plant specific rules. The suggestions may also be based on monitoring, diagnostic and forecasting models-based optimization in order to find out best operating settings. The short-term recommendations may comprise of— modifying operation settings of the APH or upstream/downstream equipment such as reducing gas flow of APH by reducing plant load, high intensity-more frequent-long duration soot-blowing operation of APH modifying maintenance activities such as preponing scheduled maintenance to accommodate APH water cleaning before possible forced outage The short-term recommendations enable the plant to minimize losses either by delaying the rise of fouling so that it can be taken care of during a preplanned maintenance rather than a forced maintenance. In the event of severe fouling conditions, the short-term recommendations assist in rescheduling the earlier planned maintenances so as to avoid losses.

A long-term recommendation is aimed at enabling efficient, cost effective operation of plant and taking advance steps to prevent forced outages due to APH fouling. This could be achieved both by modifying the operating conditions or the maintenance activities. As an example, if pressure drop forecast from forecasting module suggests pressure drop exceeding 1.5 MPa (delP$_{critical}$) after next 90 days ($t_{critical}$), the advisory module may suggest a set of operating recommendations based on domain based and plant specific rules. The suggestions may also be based on monitoring, diagnostic and forecasting models-based optimization in order to find out best operating settings. The long-term recommendations may comprise of— modifying operation practices of the APH or upstream/downstream equipment such as altering soot-blowing patterns, relaxing the critical limit set point of NOx emissions for upstream SCR equipment, choosing less NOx and SOx emitting coals as fuels continuously among others.

modifying maintenance activities such as rescheduling the planned maintenance of the entire plant a per the anticipated fouling trends of APH and retrofit/modification to APH or upstream equipment such as SCR so as to reduce the fouling rates.

The long-term recommendations enable the plant to minimize losses either by taking advance steps to slow down the rise of fouling and avoid emergency situations by managing the fouling well in time.

As an example, the advisory is a scheduled optimization model which collates the coal inventory data with the forecasted fouling conditions as input and provides a schedule for coal usage for minimizing fouling. It also recommends blending of different coals in the yard and the time of their usage in the boiler. The model suggests low sulfur, low ash coal to be used in the winter season, because during this season the chances of formation of ABS are high. On top of this, optimization model for soot-blowing operation is used to maintain minimum fouling and increase the efficiency of heat transfer of APH.

The historical data from the data repository 114 and the current data from the one or more sources 110 (DCS or LIMS) is used by the estimator models to obtain an estimate of the plurality of parameters such as air/gas temperatures, Ammonia concentration, Sulphur oxides concentration and fouling intensity in each layer, among others. In an embodiment, the system 100 may also be connected to external sources, databases and third party models. In addition, the system 100 may also receive data from specialized sensors installed on/within APH either temporarily or permanently. For example, an advanced chemical sensor for detecting levels and concentrations of ammonium bisulphate in the gas could be installed. In another example, an advanced sensor for measuring temperatures and pressures at different locations within the APH could be installed. These sensor measurements could be made available to the various modules. It should be appreciated that the utilization of system 100 is not limited to only this example. The system 100 can also be used in numerous ways by a person skilled in the art.

According to an embodiment of the disclosure, the system 100 can also act as a simulator. For that purpose, the system 100 comprises the simulation module 132. The simulation module 132 allows the operator to do an online "what-if" and "if-what" scenario analysis by providing access to monitoring, diagnostic, estimator, forecasting and advisory models. The simulation module 132 receives the real-time preprocessed plurality of data from and predicts/forecasts the plurality of parameters such as chemical deposition, differential pressure and minimum time to outage. However, the operator has an option to change the value of inputs and accordingly the output are predicted. In absence of user input, default or current values could be used as input. Initially, inputs are received from the user on various key variables required for forecasting fouling of APH in future.

The future trends are obtained for the variables as well as that for soft sensed variables that are not supplied by the user in previous step. Further, the health and fouling trends are forecasted for APH using the estimated values of actual and soft senses parameters. And finally, the records may be saved to data repository 114 on user initiation. The simulator module 132 enables better decision making by augmenting the user expertise and experience.

According to an embodiment of the disclosure, the system 100 also comprises a recalibration module 136. The recalibration module 136 periodically checks the performance of the monitoring, estimator and forecasting models against the actual plant data. If the accuracy of the model does not match pre-defined accuracy constraint/criteria, the model update alarm is generated. This triggers the auto-update loop that calibrates the predictive models based on the recent processed data of the plant. The models updated with latest data representing recent behavior of the APH are then used as soft sensors and forecasters. In case of not finding a satisfactorily accurate model, the user is alerted.

Figure 12A:
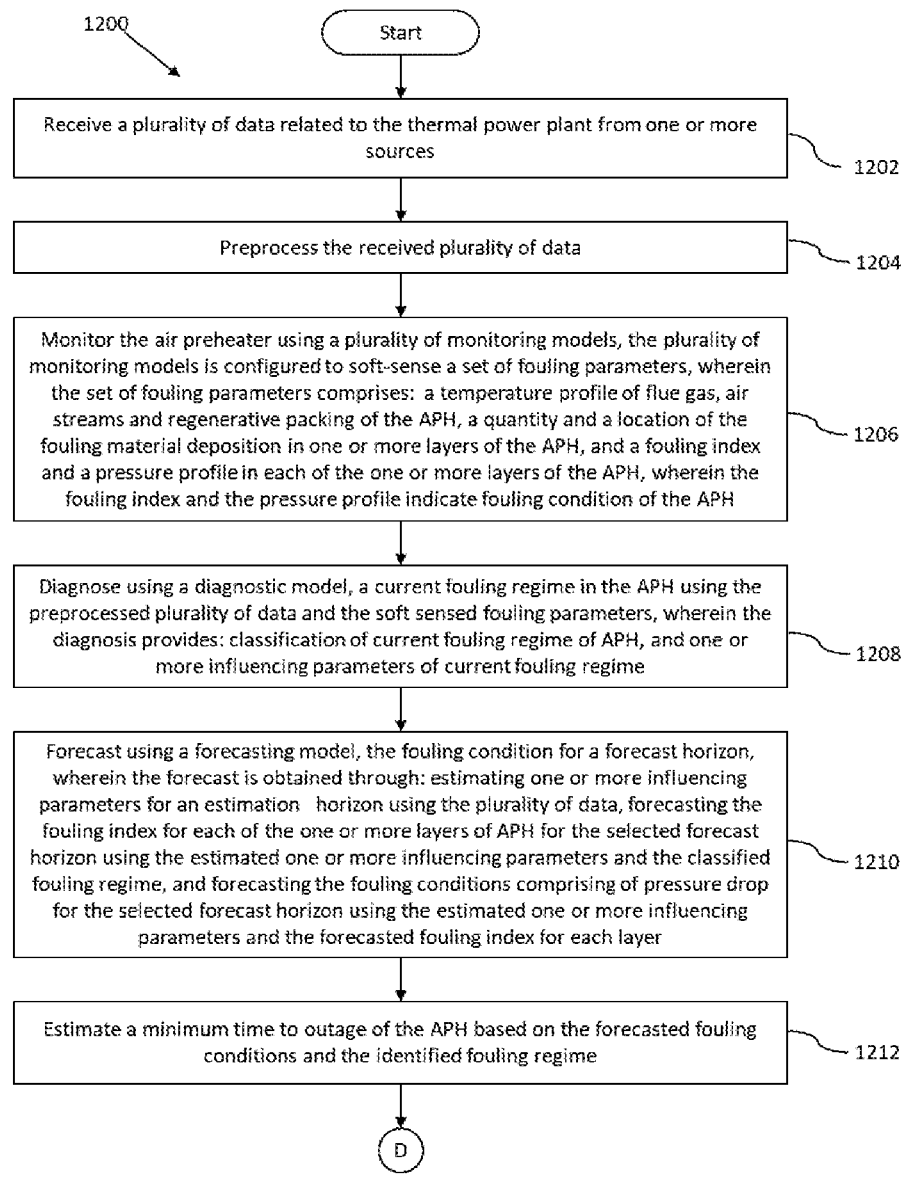
FIG. 12A-12B is a flow diagram illustrating a method for real time monitoring and forecasting of fouling of an air preheater (APH) in a thermal power plant in accordance with some embodiments of the present disclosure.
Figure 12B:
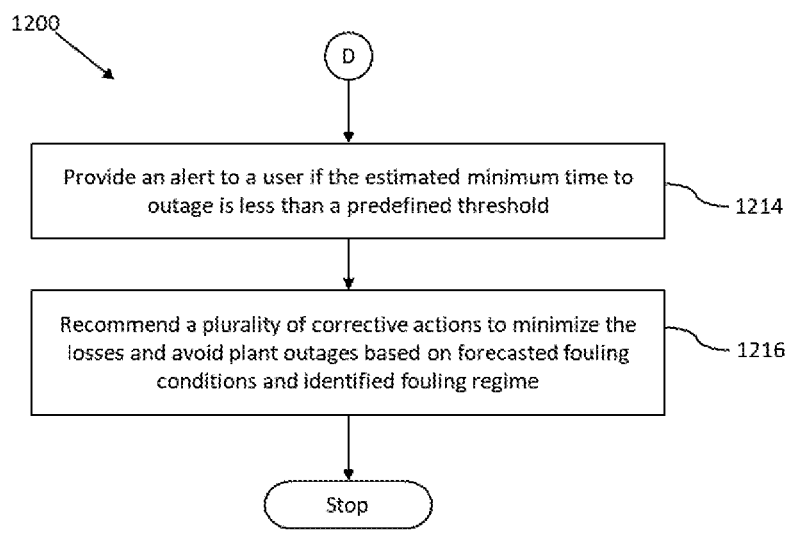

In operation a flowchart for real time monitoring and forecasting of fouling of an air preheater (APH) in a thermal power plant is shown in flowchart 1100 of FIG. 12A-12B. Initially at step 1202, a plurality of data related to the thermal power plant is received from one or more sources. At step 1204, the received plurality of data is preprocessed. Further at step 1206, the air preheater is monitored using a plurality of monitoring models, the plurality of monitoring models is configured to soft-sense a set of fouling parameters. The set of fouling parameters comprises: a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH.

At step 1208, a current fouling regime is diagnosed in the APH using the preprocessed plurality of data and the soft sensed fouling parameters. The diagnosis provides: classification of current fouling regime of APH, and one or more influencing parameters of current fouling regime. Further at step 1210, the fouling condition for a forecast horizon is forecasted. The forecast is obtained through: estimating one or more influencing parameters for an estimation horizon using the plurality of data, forecasting the fouling index for each of the one or more layers of APH for the selected forecast horizon using the estimated one or more influencing parameters and the classified fouling regime, and forecasting the fouling conditions comprising of pressure drop for the selected forecast horizon using the estimated one or more influencing parameters and the forecasted fouling index for each layer. The forecast horizon is for forecasting models and estimation horizon is for estimation models.

At step 1212, a minimum time to outage of the APH is estimated based on the forecasted fouling conditions and the identified fouling regime. At step 1214, an alert is provided to a user if the estimated minimum time to outage is less than a predefined threshold. And finally at step 1216, a plurality of corrective actions is recommended to minimize the losses and avoid plant outages based on forecasted fouling conditions and identified fouling regime.

According to an embodiment of the disclosure, the system 100 can be installed at the thermal power plant location or on a distributed (cloud) platform. The system 100 can also be used in another thermal power plant by adjusting the characteristic parameter values of the predictive models. For example, model characteristic parameters like design of APH, operating load of power plant, ambient conditions, fuel and its usage pattern, emission control norms of the region (in which power plant is located), power plant operational history (newly commissioned/old plant). Multiple systems catering to different plants/equipment may interact with each other through a common shared knowledge repository. For example, different systems can have shared remote database of characteristics of individual systems and by obtaining the insights from these characteristics further customization/improvisation of individual system is achieved. This is particularly helpful for the case where the thermal power plant/equipment is newly commissioned/has minimal data. With the help of digital family data of the existing system can be used and forecast of fouling indicators for longer durations can be obtained.

The estimator 118, the monitoring module 120 and the forecasting module 126 comprises estimator model, monitoring model and forecasting model, respectively. The system 100 is largely driven by these predictive models based on a combination of first principles-based modelling, data science and artificial intelligence based on domain knowledge. The model inputs may comprise of plant operation data, design information, maintenance information, fuel information, domain specific tuning parameters, and equipment parameters among others. The models could be built offline based on above information and could be updated online as well. An example scenario of model interaction framework is explained below. Though it should be appreciated that the system 100 can also be used in many other ways by a person skilled in the art.

The forecasting model along with estimator models could be used in a repetitive manner at regular intervals in order to extend their forecast capability. It must be appreciated that the methodology described in estimator model, monitoring model, diagnosing model, forecasting model and advisory model works in real time/near real time and work parallel to give maximum visibility to the operator to restore the health of APH.

Though the system 100 is explained in accordance with the thermal power plant, it should be appreciated that the system 100 is also applicable to other plants with APH.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of planning the maintenance of the thermal power plant in an optimal way. The embodiment, thus provides a real time monitoring and forecasting of fouling of an air preheater (APH) in a thermal power plant.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g.

an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method for real time monitoring and forecasting of fouling of an air preheater (APH) in a thermal power plant, the method comprising:
   receiving, via a user interface, a plurality of data related to the thermal power plant from one or more sources;
   preprocessing, via one or more hardware processors, the received plurality of data;
   monitoring, via the one or more hardware processors, the air preheater using a plurality of monitoring models, the plurality of monitoring models is configured to soft-sense a set of fouling parameters, wherein the set of fouling parameters comprises:
   a temperature profile of flue gas, air streams and regenerative packing of the APH,
   a quantity and a location of the fouling material deposition in one or more layers of the APH, and
   a fouling index and a pressure profile in each of the one or more layers of the APH, wherein the fouling index and the pressure profile indicate fouling condition of the APH;
   diagnosing, via the one or more hardware processors, using a diagnostic model, a current fouling regime in the APH using the preprocessed plurality of data and the soft sensed fouling parameters, wherein the diagnosis provides:
   classification of current fouling regime of APH, and
   one or more influencing parameters of current fouling regime;
   forecasting, via the one or more hardware processors, using a forecasting model, the fouling condition for a forecast horizon, wherein the forecast is obtained through:
   estimating one or more influencing parameters for an estimation horizon using the received plurality of data,
   forecasting the fouling index for each of the one or more layers of APH for the selected forecast horizon using the estimated one or more influencing parameters and the classified fouling regime, and
   forecasting the fouling conditions comprising of pressure drop for the selected forecast horizon using the estimated one or more influencing parameters and the forecasted fouling index for each layer;
   estimating, via the one or more hardware processors, a minimum time to outage of the APH based on the forecasted fouling conditions and the classified fouling regime;
   providing, via the one or more hardware processors, an alert to a user if the estimated minimum time to plant outage is less than a predefined threshold; and
   recommending via the one or more hardware processors, a plurality of corrective actions to minimize the losses and avoid the plant outage based on forecasted fouling conditions and classified fouling regime.

2. The method according to claim 1, wherein the plurality of data related to the thermal power plant comprises:
   real-time operation data from a plurality of sensors for the APH and upstream and downstream equipment,
   ambient conditions data from internal or external sources,
   fuel and materials property, usage and inventory data,
   design specifications data for the APH and the thermal power plant; and
   maintenance history and scheduling data.

3. The method according to claim 1, the one or more sources comprises of distributed control system (DCS), historian, laboratory information management system (LIMS), databases, advanced sensors, external sources, manual input and other digital systems in plant.

4. The method according to claim 1, wherein the preprocessing comprises one or more of:
checking erroneous data in the plurality of data,
removing outliers in the plurality of data,
imputing new values in place of missing values,
merging and synchronizing plant data from multiple sources,
synchronizing the plurality of data with the past data, and
transforming the plurality of data into different shape, size and frequency based on the APH design specifications, forecasting horizon and the available plant data.

5. The method according to claim 1, wherein the estimation horizon and the forecast horizon are selected by a user or set automatically.

6. The method according to claim 1, wherein the provided alert is one of a short-term alert or a long-term alert, wherein
the short-term alert is generated when one of the plurality of fouling conditions is crossing a predefined threshold before a predefined set period, and
the long-term alert is generated when one of the plurality of fouling conditions is crossing the predefined threshold after the predefined set period.

7. The method according to claim 1, wherein corrective actions comprise of:
a short-term recommendation of operation and maintenance suggestions comprising modifying operation settings of the APH or upstream/downstream equipment, modifying soot-blowing parameters and cleaning of the APH, and
a long-terms recommendation of operation and maintenance suggestions comprising alternate usage of fuels, relaxed pollutant norms and modification of equipment.

8. The method according to claim 1, wherein the forecasting is performed after every predefined time interval.

9. The method according to claim 1, wherein the fouling regimes are classified into one of under normal fouling, abnormal fouling and severe fouling regimes.

10. The method according to claim 1, further comprising providing a notification to the user about the identified one or more causes of the current fouling condition.

11. The method according to claim 1, further comprising displaying on a display device:
the real-time predicted fouling material deposition and location;
the real-time temperature profile of gas/air/metal, real-time pressure profile and real-time fouling index of each layer of APH
the real-time classification of current fouling regime
the real time forecasted results of fouling index and pressure drop for each of the layers of APH, and
the real-time recommendations.

12. The method according to claim 1 further comprising re-calibrating the plurality of models periodically based on the plant data accumulated in the database and the plurality of model tuning parameters stored in the database.

13. A system for real time monitoring and forecasting of fouling of an air preheater (APH) in a thermal power plant, the system comprises:
an input/output interface for receiving a plurality of data related to the thermal power plant from one or more sources;
one or more hardware processors;
a memory in communication with the one or more hardware processors, wherein the one or more first hardware processors are configured to execute programmed instructions stored in the one or more first memories, to:
preprocess the received plurality of data;
monitor the air preheater using a plurality of monitoring models, the plurality of monitoring models is configured to soft-sense a set of fouling parameters, wherein the set of fouling parameters comprises:
a temperature profile of flue gas, air streams and regenerative packing of the APH,
a quantity and a location of the fouling material deposition in one or more layers of the APH, and
a fouling index and a pressure profile in each of the one or more layers of the APH, wherein the fouling index and the pressure profile indicate fouling condition of the APH;
diagnosis using a diagnostic model, a current fouling regime in the APH using the preprocessed plurality of data and the soft sensed fouling parameters, wherein the diagnosis provides:
classification of current fouling regime of APH, and
one or more influencing parameters of current fouling regime;
forecast using a forecasting model, the fouling condition for a forecast horizon, wherein the forecast is obtained through:
estimating one or more influencing parameters for an estimation horizon using the received plurality of data,
forecasting the fouling index for each of the one or more layers of APH for the selected forecast horizon using the estimated one or more influencing parameters and the classified fouling regime, and
forecasting the fouling conditions comprising of pressure drop for the selected forecast horizon using the estimated one or more influencing parameters and the forecasted fouling index for each layer;
estimate a minimum time to outage of the APH based on the forecasted fouling conditions and the classified fouling regime;
provide an alert to a user if the estimated minimum time to plant outage is less than a predefined threshold; and
recommend a plurality of corrective actions to minimize the losses and avoid plant outage based on forecasted fouling conditions and classified fouling regime.

14. The system according to claim 13 further comprising a data repository configured to store the data generated by the air preheater, wherein the data comprises static information and dynamic information, wherein the static information comprises plant/equipment design information, maintenance information, fuel information, materials information, expert user knowledge and the dynamic information comprises processed/raw plant data, ambient conditions, predictive models and their versions, predicted and forecasted data, generated recommendations and user actions.

15. A computer program product comprising a non-transitory computer readable medium having a computer readable program embodied therein, wherein the computer readable program, when executed on a computing device, causes the computing device to:
receive, via a user interface, a plurality of data related to the thermal power plant from one or more sources;
preprocess the received plurality of data;
monitor the air preheater using a plurality of monitoring models, the plurality of monitoring models is configured to soft-sense a set of fouling parameters, wherein the set of fouling parameters comprises:

a temperature profile of flue gas, air streams and regenerative packing of the APH, a quantity and a location of the fouling material deposition in one or more layers of the APH, and a fouling index and a pressure profile in each of the one or more layers of the APH, wherein the fouling index and the pressure profile indicate fouling condition of the APH;

diagnosis using a diagnostic model, a current fouling regime in the APH using the preprocessed plurality of data and the soft sensed fouling parameters, wherein the diagnosis provides:

classification of current fouling regime of APH, and one or more influencing parameters of current fouling regime;

forecast using a forecasting model, the fouling condition for a forecast horizon, wherein the forecast is obtained through:

estimating one or more influencing parameters for an estimation horizon using the received plurality of data, forecasting the fouling index for each of the one or more layers of APH for the selected forecast horizon using the estimated one or more influencing parameters and the classified fouling regime, and forecasting the fouling conditions comprising of pressure drop for the selected forecast horizon using the estimated one or more influencing parameters and the forecasted fouling index for each layer;

estimate, a minimum time to outage of the APH based on the forecasted fouling conditions and the classified fouling regime;

provide an alert to a user if the estimated minimum time to plant outage is less than a predefined threshold; and recommend a plurality of corrective actions to minimize the losses and avoid the plant outage based on forecasted fouling conditions and classified fouling regime.

* * * * *